United States Patent [19]

Weissman

[11] 3,850,054
[45] Nov. 26, 1974

[54] COMPOSITE DRILL

[76] Inventor: Bernard Weissman, 304 Ashland Pl., Brooklyn, N.Y. 11213

[22] Filed: Dec. 14, 1972

[21] Appl. No.: 315,002

Related U.S. Application Data

[62] Division of Ser. No. 123,135, March 11, 1971, Pat. No. 3,726,014.

[52] U.S. Cl.................... 76/108 R, 32/48, 408/226
[51] Int. Cl............................................ B21k 5/02
[58] Field of Search...... 40/2, 2.2; 76/108 R, 108 T; 408/226; 32/46, 48

[56] References Cited
UNITED STATES PATENTS

| | | | |
|---|---|---|---|
| 171,106 | 12/1875 | Donaldson.......................... | 40/2.2 X |
| 1,984,839 | 12/1934 | Murray................................ | 40/2 R |
| 2,915,926 | 12/1959 | Woerner............................. | 40/2.2 X |
| 3,251,150 | 5/1966 | Sedgwick et al..................... | 40/2.2 |

*Primary Examiner*—Leonidas Vlachos
*Attorney, Agent, or Firm*—Friedman & Goodman

[57] ABSTRACT

A composite drill for drilling channels in teeth, the drill comprising a drill bit retaining body and a drill bit connected to the drill bit retaining body, the drill bit retaining body having a heat conductive capacity of greater magnitude than that of the drill bit. The drill bit retaining body and drill bit are interconnected such as by means which is self-collapsible upon subjection of the drill bit to frictional resistance of lesser magnitude than that magnitude required for causing tooth fracture. The method of forming the composite drill comprises anodizing the drill bit retaining body to permanently color the latter for distinguishing the nature of the drill bit associated therewith.

2 Claims, 5 Drawing Figures

PATENTED NOV 26 1974  3,850,054

COMPOSITE DRILL

This is a division, of application Ser. No. 123,135 filed Mar. 11, 1971, now Pat. No. 3,726,014.

BACKGROUND OF THE INVENTION

The present invention relates generally to dental drills for drilling channels in teeth and more particularly to a composite drill and a method of forming the composite drill, the drill comprising a drill bit retaining body and a drill bit in collapsible operative association with one another.

The dental drill is possibly the most vital tool available to dentist in the course of their every day practice. The dental drill, as is well understood, may be utilized for many purposes such as eliminating caries, initiating the process of building superstructures on undermined dentition and initiating the process of pulp extraction, etc. Dental drills, although extremely small, have a wide variety of cross-sectional extents and peripheral contours each for accommodating a specific purpose to permit the dentist to function properly. Because of the very small nature of these drills, the latter must be inspected carefully upon selection because of the difficulty in distinguishing the drills from one another by the naked eye.

The conventional drills are usually maintained in a container in separated fashion each in a specific location relative to the others so that the dentist or the dental technician can rapidly select the proper drill without wasting precious time. However, as those skilled in the art readily appreciate, these drills tend to be comingled with one another and often during the course of surgery, time must be taken to inspect the drill to insure that the particular drill required for the specific function of immmediate concern is properly selected. Thus, the conventional dental drills have a serious disadvantage with regard to distinguishing one from the other.

Another disadvantage with regard to the conventional drill is the fact that the drill is normally constituted of an elongate shank at the end of which is disposed hellical convolutions for cutting into a patient's teeth. The elongate shank is generally directly placed within a chuck provided in a power tool, in direct contact with the chuck, and upon extended use of the particular drill, the heat build-up becomes intollerable and, therefore, the heated drill must be replaced with a similar drill. Thus, There is an unwarrranted hiatus in the drilling procedure which is clearly unacceptable.

Another serious disadvantage with regard to the conventional drill is the fact that the drill itself is rigidly mounted within the chuck of the power tool and, thus, there is no satisfactory provision for rotational displacement of the chuck relative to the drill which is often required in order to prevent tooth fracture. In this respect, the drill itself often engages a snag or point within the tooth that excessively resists rotation of the drill and, thus, further rotation of the drill relative to the tooth may fracture the tooth or damage the drill itself. Unless the dentist is specifically aware that he has reached a snag within the channel being drilled then in the absence of the capacity for the chuck to rotate relative to the drill the drill would continue to rotate and, therefore, either fracture the tooth or be deformed itself beyond repair. This is certainly an unacceptable condition both with respect to the patient and dentist alike.

It is clear from the above that there are numerous disadvantages and drawbacks with regard to the conventional dental drill and, therefore, clearly there is a void in the art.

SUMMARY OF THE INVENTION

Accordingly it is an object of the present invention to provide a composite drill that includes means for easily distinguishing the nature of the drill bit associated therewith from that of other drill bits associated with other similar composite drills respectively.

It is another object of the present invention to provide a composite drill having means for rapidly exhausting heat developing therein into the atmosphere.

It is still a further object of the present invention to provide a composite drill that permits relative rotational displacement of the chuck within which the drill is mounted and the drill bit itself upon subjecting the drill bit to frictional resistance of lesser magnitude than that magnitude required for causing tooth fracture.

It is still a further object of the present invention to provide a composite drill that enhances the visibility of the drilling area.

It is another object of the present invention to provide a composite drill having means for supporting an extremely small diameter drill bit.

To this end the present invention relates to a composite drill for drilling channels in teeth, the drill comprising a drill bit retaining body and a drill bit connected to the drill bit retaining body, the drill bit retaining body having a heat conductive capacity of greater magnitude than that of the drill bit. The drill bit retaining body and drill bit are interconnected such as by means which is self-collapsible upon subjection of the drill bit to frictional resistance of lesser magnitude than that magnitude required for causing tooth fracture. The method of forming the composite drill comprises anodizong the drill bit retaining body to permanently color the latter for distinguishing the nature of the drill bit associated therewith.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which.

DETAILED DESCRIPTION OF THE INVENTION

Figure 1:
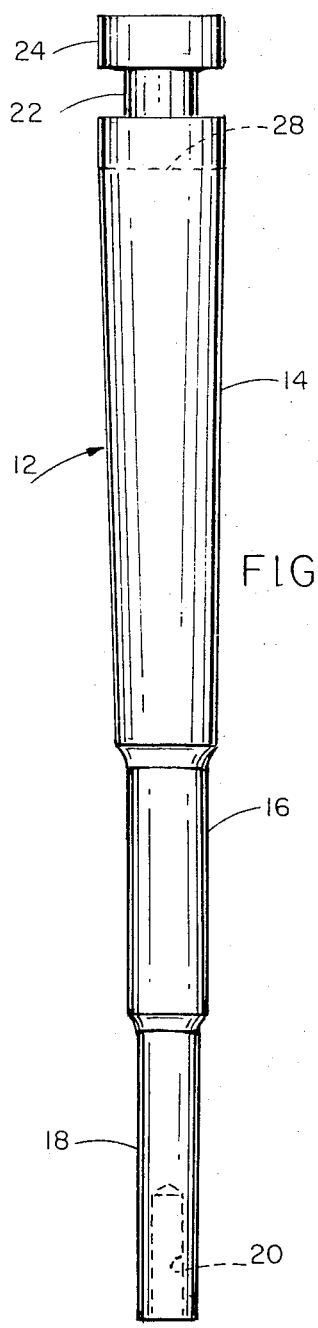
FIG. 1 illustrates an enlarged elevational view, partly in phantom, of the drill bit retaining body according to the present invention.
Figure 2:
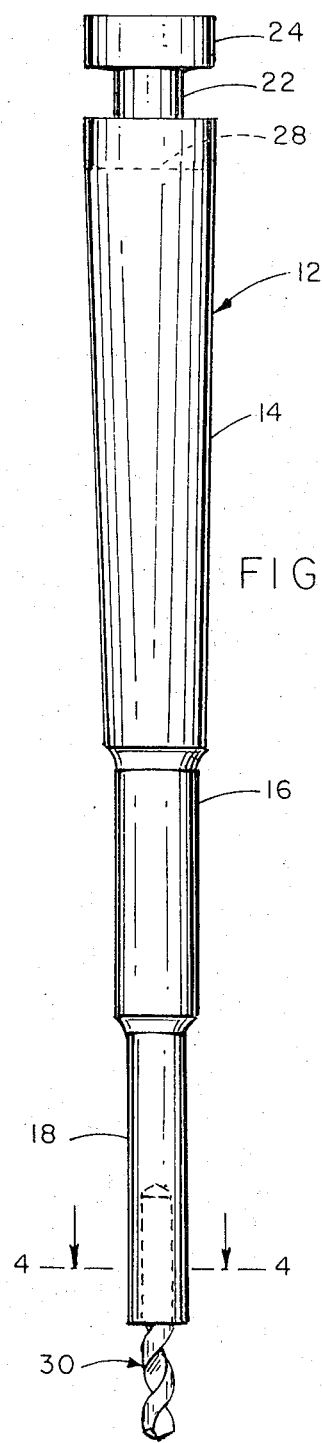
FIG. 2 illustrates an enlarged elevational view, partly in phantom, of the entire composite drill according to the present invention.

Referring now to the drawing and more specifically to FIGS. 1 and 2 thereof the present invention comprises a composite drill generally denoted by the reference character 10. The composite drill 10 comprises a drill bit retaining body 12 having a trailing shank portion 14, an intermediary shank portion 16 and a pilot shank portion 18.

As clearly illustrated in FIG. 1 the trailing shank portion 14 is tapered slightly so it may seat flushly within a power tool chuck for rotating the composite drill, the chuck and power tool which are conventional and, therefore, not shown in the drawing. Furthermore, the intermediary shank portion 16 and the pilot shank portion 18 are respectively associated with the trailing shank portion 14 in stepwise fashion each of lesser cross-sectional extent than that of the upper adjoining shank portion.

As those skilled in the art readily appreciate the stepwise association of each of these shank portions relative to one another is to provide a maximum degree of strength for each of the latter and yet as each decreases in transverse cross-section there is promoted enhanced visibility at the very drilling extremity of the pilot shank portion 18. It should be understood of course that the stepwise association of each of these shank portions with one another can be modified somewhat such that each portion is self tapered or in fact the entire drill bit retaining body can be tapered from one end to the other.

Figure 3:
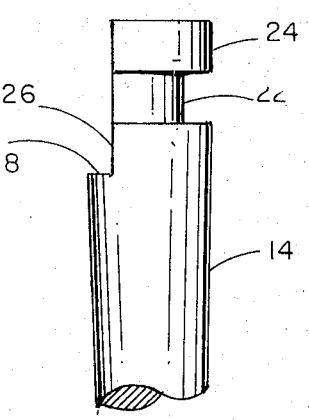
FIG. 3 illustrates a fragmentory elevational view of the upper extent of the composite drill according to the present invention.

As illustrated in FIG. 1 the pilot shank portion 18 is provided with an axially extending bore 20 for receiving a drill bit in a manner as illustrated in FIG. 2 and we will be discussed further below. The trailing shank portion 14 at its uppermost end of maximum cross-section is provided with an axially extending neck 22 of a lesser cross-sectional extent than that of the trailing shank portion 14 and upon which is mounted an eccentric head 24 as illustrated in FIGS. 1 and 2. As illustrated most clearly in FIG. 3 the trailing shank portion 14 is provided with two mutually perpendicular surfaces 26 and 28 respectively each defining cooperatively a cutout and presenting the head 24 with its eccentricity. The purpose of the neck 22 and the eccentric head 24 is to enhance the detachable connection of the composite drill 10 with that of a specific chuck and power tool. The chuck and power tool have structure for specifically accommodating the head 24 and neck 22 in detachable yet conventional relation and, therefor, the chuck and power tool are not illustrated in the drawing.

Figure 4:
FIG. 4 illustrates a cross-sectional view taken along the line 4—4 in FIG. 2.
Figure 5:
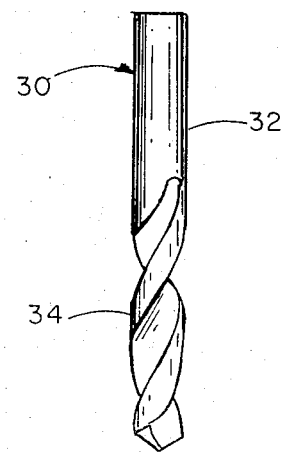
FIG. 5 illustrates an enlarged view of the drill bit in accordance with the present invention.

As illustrated in FIG. 4 the composite drill 10 includes a drill bit 30 having a shank portion 32 and a drilling end portion 34 with helical convolutions extending thereon. The shank portion 32 of the drill bit 30 may be received within the bore 20 of the drill bit retaining body 12 as illustrated in FIGS. 2 and 4 respectively.

The means for interconnecting the drill bit 30 and the drill bit retaining body 12 is carefully chosen such that the latter said means is self-collapsible upon subjection of the drill bit to frictional resistance of lesser magnitude than that magnitude required for causing tooth fracture. In this respect, as discussed above, during the formation of a channel in a tooth the drill bit may be subjected to a snag or frictional resistance and, unless the dentist is specifically aware of this particular snag, continued rotation of the drill bit 30 may cause fracture of the tooth or in fact deformation or breakage of the bit 30 itself. Thus, the means for interconnecting the drill bit 30 and the drill bit retaining body 12 is constituted such that should the bit 30 be subjected to a snag during channel formation then the latter said means would collapse itself and thereby permit the drill bit 30 to remain idle whereas the drill bit retaining body 12 would continue to rotate with the chuck relative to the idled drill bit 30. Thus, even if the dentist is completely unaware of the snag there is completely obviated any possibility for the tooth to fracture.

Upon collapsing of the latter said means, the dentist simply removes the drill bit retaining body 12 from the surgical area and then may easily withdraw the drill bit 30 with a pliers or the like from the channel within which the latter is embedded.

The latter said means for interconnecting the drill bit retaining body 12 and the drill bit 30 may be constituted of a self-hardening adhesive which is to be interposed between the drill bit 30 and the pilot shank portion 18 within the bore 20 in the latter. The nature of the self-hardening adhesive should be such that it is sufficient to permit the drill bit retaining body 12 and drill bit 30 to remain in fixed relation with one another for drilling a channel in a tooth and yet be sufficiently weak to collapse itself when the drill bit 30 is subjected to frictional resistance of a specific quantity. The specific quantity of frictional resistance of course can be well determined easily by those skilled in the art, who understand the biological capacity of teeth to withstand limited stress and impact, and should be clearly selected so as to be of a lesser magnitude than that magnitude required for causing tooth fracture of the unimpaired portion of the normal tooth.

Of course as those skilled in the art readily appreciate the bore 20 and the shank 32 of the drill bit 30 may be crimped relative to one another to constitute cooperatively the means for interrconnecting the drill bit retaining body 12 and drill bit 30. The extent of crimping may be easily determined to maintain the drill bit 30 and drill bit retaining body 12 in generally fixed relation with one another so that a channel may be formed in a tooth and yet permit the drill bit retaining body 12 to rotatably slip relative to the drill bit 30 thus permitting the drill bit 30 to remain in an idle condition when the latter is subjected to a snag or frictional resistance of lesser magnitude than that magnitude required for causing tooth fracture as discussed above. Of course other means may be devised for interconnecting the drill bit retaining body 12 and drill bit 30 which are for purposes of description "self-collapsing" and all such means for interconnecting the drill bit retaining body 12 and drill bit 30 for effecting the extremely vital principle as aforementioned are deemed to be within the concepts of the present invention.

Another significant feature or principle of the present invention is the fact that the drill bib retaining body 12 is constituted of an extremely highly heat conductive material. In this respect, the drill bit retaining body 12 is generally constituted of aluminum because of the heat conductive nature thereof whereas the drill bit 30 is generally constituted of steel. Thus there is completely obviated any possibility for the continued build-up of great quantities of heat since in fact the drill bit retaining body 12 constituted of aluminum acts immediately to discharge or exhaust heat into the environment as the heat is transmitted thereto from the drill bit 30. The advantage of this particular feature as those skilled in the art readily appreciate is the fact that the composite drill 10 need not be replaced periodically because of intolerable heat conditions.

Another vital feature of the present invention is the fact that the composite drill 10 is formed in a manner such that the drill bit retaining body 12 is permanently colored with a specific color by anodizing the latter by conventional means and, therefore, the description of the anodizing procedure is omitted herefrom for the sake of clarity. Thus each composite drill 10 is permanently colored with a specific color to distinguish the nature of the drill bit 30 therein from that of other drill bits associated with similar composite drills in accordance with the present invention. Of course the anodizing procedure can be done either before or after the interconnection of the drill bit retaining body 12 and the drill bit 30. It should be furthermore understood that although the drill bit retaining body 12 is colored by anoidizing as described above other suitable means for permanently coloring the drill bit retaining body 12 may be readily employed and still remain within the purview of the present invention.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A method of forming a composite drill including a drill bit retaining body and a drill bit for drilling channels in teeth, said method comprising forming said body with an elongate extent and opposite end portions from a high heat conductive material having a heat conductive capacity of greater magnitude than said drill bit to draw heat from drill bit and discharge the heat into surrounding environment when drilling the channels, anodizing said body a predetermined color associated with said drill bit for differentiating said drill bit from other drill bits of a different nature which are associated respectively with similar composite drills, forming an axially extending bore in one of said end portions of said body, positioning a shank of said drill bit in said bore of said body, and interposing a self-hardening adhesive in said bore between said shank and said one end portion of said body to define securing means for permitting rotation of said body relative to said drill bit at a predetermined frictional resistance of lesser magnitude than that magnitude required for causing tooth fracture.

2. A method of forming a composite drill including a drill bit retaining body and a drill bit for drilling channels in teeth, said method comprising forming said body with an elongate extent and opposite end portions from a high heat conductive material having a heat conductive capacity of greater magnitude than said drill bit to draw heat from said drill bit and discharge the heat into surrounding environment when drilling the channels, anodizing said body a predetermined color associated with said drill bit for differentiating said drill bit from other drill bits of a different nature which are associated respectively with similar composite drills, forming an axially extending bore in one of said end portions of said body, positioning a shank of said drill bit in said bore of said body, and crimping said bore and said shank relative to one another to constitute cooperative securing means for permitting rotation of said body relative to said drill bit at a predetermined frictional resistance of lesser magnitude than that magnitude required for causing tooth fracture.

* * * * *